April 20, 1948.  T. RITCHIE  2,439,864
FLOAT VALVE
Filed Jan. 14, 1944
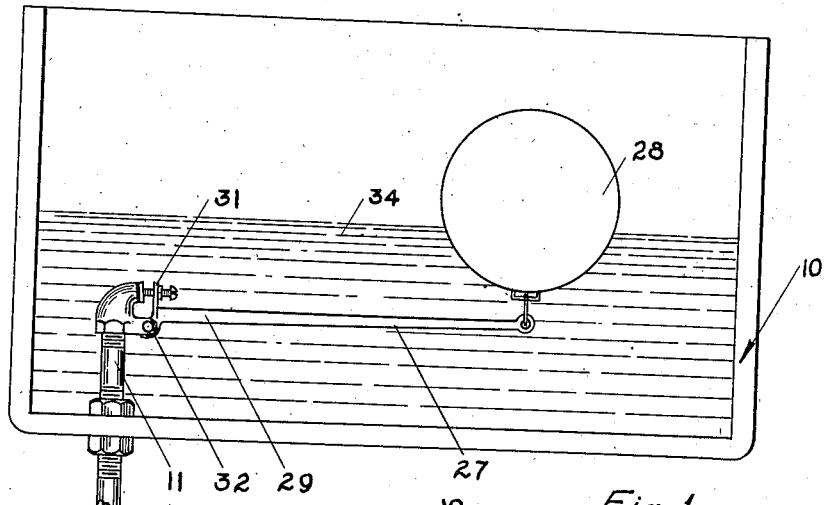
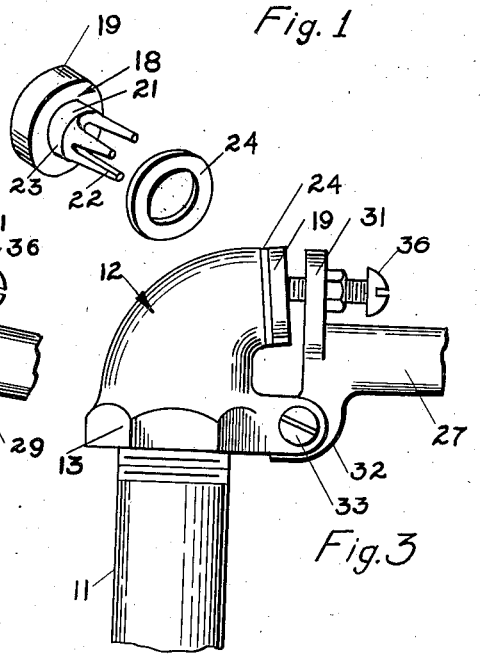
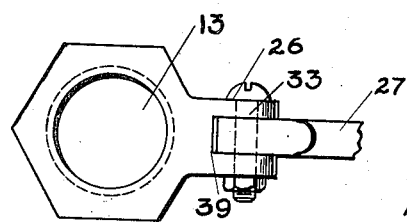
Inventor
Thomas Ritchie
by Rudolph L. Lowell
Attorney Patented Apr. 20, 1948

2,439,864

UNITED STATES PATENT OFFICE 2,439,864

FLOAT VALVE

Thomas Ritchie, Oskaloosa, Iowa, assignor to Charles B. Wade, Ottumwa, Iowa

Application January 14, 1944, Serial No. 518,484

1 Claim. (Cl. 137—104)

This invention relates generally to valve mechanisms and in particular to a float valve mechanism used for stock watering tanks.

An object of this invention is to provide an improved float valve mechanism.

Another object of this invention is to provide a control valve which is capable of being held closed by an associated float against water surges operating within the valve.

A further object of this invention is to provide a float valve mechanism which is simple in design, comprised of but a relatively few number of parts, efficient in operation, and readily attachable to an upright supply pipe within a stock watering tank.

A feature of this invention is found in the provision of a float valve mechanism in which a float actuated control arm is adjustable relative to a controllable valve member to vary the valve discharge outlet concurrently with a variation in the valve closing position of the arm.

Further objects, features and advantages of this invention will become apparent from the following description when taken in connection with the accompanying drawings in which:

Fig. 1 shows the float valve mechanism of this invention in assembly position within a watering tank;

Fig. 2 is an elevational view of the float valve, with certain parts being broken away to more clearly show its construction;

Fig. 3 is an elevational view illustrated similarly to Fig. 2 but with parts in changed position;

Fig. 4 is a bottom plan view of the float valve; and

Fig. 5 is an exploded perspective detail view of a valve member for the float valve mechanism.

Referring to the drawings the float valve mechanism of this invention is shown in Fig. 1 in assembly relation within a watering tank 10 having a water pipe 11 projected through its bottom upwardly into the tank. The pipe 11 is connected with a suitable source of supply such as a city main, a pump, a storage tank or the like. The valve mechanism includes a valve casing 12 of substantially elbow shape having an inlet 13 and an outlet 14 (Figs. 2 and 4). The elbow 12 is of a reduced tapered construction from the inlet 13 to the outlet 14 so that the inlet is appreciably smaller than the outlet. The inlet 13 is of a diameter corresponding to the diameter of the pipe 11 and is internally threaded for connection with the top of the pipe 11 as shown in Figs. 1 and 4. With the inlet 13 thus attached to the pipe 11 the outlet 14 is extended in a substantially horizontal plane substantially normal to the inlet 13.

As shown in Fig. 2 the outlet 14 is formed with a bore portion 16 having a flat seat 17 about its outer end and on the outside of the casing 12. The seat 17 is operatively associated with a valve member 18 (Figs. 2 and 5) integrally formed with a flat disc portion 19 and an axially extended stem portion 21. The stem portion 21 is comprised of a plurality of angularly spaced leg members 22 connected with the disc portion 19 through an annular shoulder 23 concentric with but of a smaller diameter than the disc 19.

A ring-like gasket 24, composed of rubber or other like suitable material, is adapted to be positioned about the annular shoulder 23 and against the disc 19. In the assembly of the float valve mechanism the leg members 22 are freely received within the bore 16 at the casing outlet 14 and are of a length to provide for the ring 24 being positioned in seating engagement against the seat 17, whereby to close the outlet 14.

Integrally formed with the casing 12 is a U-shaped support 26 (Figs. 2 and 4) which is extended laterally from the inlet 13 and below the outlet 14. An elongated float arm 27 is attachable at one end to a float 28 and is formed at its other end 29 with a pair of oppositely extended lateral projections 31 and 32. As best appears in Figs. 2 and 3 the projection 31 is of a substantially straight form, while the projection 32 is extended laterally and then bent outwardly from the arm end 29.

The projection 32 is of a width to be loosely received between the legs of the U-supporting member 26 and is pivotally supported between the U legs on a bolt member 33 carried in the legs, and with the projection 31 extended upwardly to a position opposite the outlet 14 as shown in Fig. 2. Thus on any variation of the level of the liquid 34 in the tank 10, the arm 27 is pivotally movable in an up and down direction to in turn pivotally move the projection 31 relative to the outlet 14. Adjustably supported in the projection 31 is an adjustable screw 36 having one end 37 engageable with the disc portion 19 of the valve member 18.

In the operation of the float valve mechanism the valve member 18 is moved to a valve-closing position, as shown in Figs. 1 and 3, by the arm 27 in response to a lifting of the float 28 by the raising of the water 34 in the tank 10 to a predetermined level. It is readily apparent, of course, that during the lifting of the arm 27 the end 37 of the adjustable screw 36 is in continuous engagement with the disc portion 19 of the valve member 18 and slidably movable thereon. The closed position of the valve member 18, therefore, defines the limit of the upward pivotal movement of the arm 27.

On a recession of the water 34 within the tank 10 the float 28 is lowered to in turn permit a downward pivotal movement of the arm 27. This downward pivotal movement is limited by the engagement of the end 38 of the projection 32 with the connecting portion 39 between the legs of the U-shaped support 26 as shown in Fig. 2. As the arm 27 is pivoted downwardly the valve member 18 might remain in a closing position relative to the outlet 14, so that the end 37 of the adjusting screw 36 is moved out of engagement with the disc portion 19 of the valve member. However, as soon as water is supplied through the pipe 11 the valve member is forced outwardly away from the outlet 14 and against the screw 36. By virtue of the spaced relation of the legs 22 of the valve member 18 a large opening is provided for a free passage of the water from the outlet 14 into the tank 10.

With the arm 27 in a stopped position against the portion 39 of the U-supporting member 26, the arm projection 31 is spaced a distance away from the seat 17 which is less than the total length of the valve member 18, so that the leg members 22 are always retained in the outlet 14 to provide for a closing of the valve, on a later pivotal movement upwardly of the arm 27.

By adjusting the screw 36 the discharge of the water from the outlet 14 can be varied, to accommodate the pressure on the water supplied through the pipe 11. Thus for a relatively high water pressure the screw 36 may be adjustably moved toward the left, as view in Fig. 2, to decrease the water discharge opening, while for low pressures within the pipe 11 the screw 36 may be adjustably moved toward the right, as also viewed in Fig. 2, to provide for a maximum movement of the valve 18 relative to the outlet 14.

It is apparent, of course, that the adjustment of the screw 36 may also be made to vary the level of the liquid 34 in the tank 10 over a range of heights. This is accomplished, by virtue of the fact that as the screw 36 is extended from the projection 31 toward the outlet 14 the upward movement of the arm 27 is stopped at progressively lower positions.

In the use of the control valve mechanism of this invention it has been found that the tapered elbow construction of the valve casing 12 and its relative assembly with an upright pipe 11 substantially eliminate any tendency of the valve member 18 being opened, after it is in a closed position, by any water surges produced in the pipe 11, such as when the pipe 11 is connected with a reciprocating type pump in common use on farms and the like.

From a consideration of the above description it is seen that the valve control mechanism is of a very simple construction, flexible in application, and readily adjustable to operate efficiently at varying water supply pressures, and to provide for a variation of the height of the level of the liquid in the tank in which it is used. It is to be understood, of course, that a stationary projection or lug may be provided on the projection 31 in place of the adjustable screw 36.

Although the invention has been described with respect to a preferred embodiment thereof it is to be understood that it is not to be so limited since modifications and changes can be made therein which are within the full intended scope of this invention as defined by the appended claim.

I claim:

A float valve comprising a casing of elbow shape having an inlet adapted for connection with the top of an upright liquid supply pipe, and an outlet provided with a seat portion on the outside thereof, with said seat being in a plane inclined upwardly and inwardly of said casing, and with said outlet being of a reduced diameter relative to said inlet, a valve for said outlet comprised of a disc member having a plurality of circumferentially arranged legs projected laterally from one side thereof, and spaced apart from each other over substantially their full length, with said legs being loosely received within said outlet to provide for the movement of said disc member into and out of closing engagement with said seat portion, a float-supporting arm having a pair of oppositely extended lateral projections on one end, means pivoting one of said projections adjacent said inlet to provide for an up and down pivotal movement of said arm, with the second projection being pivotally movable toward and away from the outlet of said casing and engageable with said disc to control the operation of said valve member in response to the pivotal movement of said arm, and a stop on said casing engageable with said first projection to limit the downward pivotal movement of said arm at a position such that said disc member is retained by said second projection against falling out of said outlet.

THOMAS RITCHIE.

REFERENCES CITED

The following references are of record in the file of this patent:

UNITED STATES PATENTS

| Number | Name | Date |
|---|---|---|
| 732,776 | Neumeyer | July 7, 1903 |
| 1,094,796 | Levering | Apr. 28, 1914 |
| 1,328,036 | Drew | Jan. 13, 1920 |

FOREIGN PATENTS

| Number | Country | Date |
|---|---|---|
| 32,305 | Germany | 1885 |
| 25,835 | Great Britain | Dec. 7, 1898 |
| 101,072 | Australia | May 27, 1937 |
| 378,712 | Italy | Feb. 22, 1940 |
| 109,822 | Australia | Feb. 29, 1940 |